US008837296B2

(12) United States Patent
Kosbab et al.

(10) Patent No.: US 8,837,296 B2
(45) Date of Patent: Sep. 16, 2014

(54) METHOD AND APPARATUS OF TRANSACTION DETERMINATION FOR NON-TCP PROTOCOLS

(75) Inventors: Bruce Kosbab, Colorado Springs, CO (US); Dan Prescott, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 633 days.

(21) Appl. No.: 12/398,974

(22) Filed: Mar. 5, 2009

(65) Prior Publication Data

US 2009/0225659 A1 Sep. 10, 2009

Related U.S. Application Data

(60) Provisional application No. 61/034,922, filed on Mar. 7, 2008.

(51) Int. Cl.
*H04J 1/16* (2006.01)
*H04L 12/26* (2006.01)
(52) U.S. Cl.
CPC ............ *H04L 12/2602* (2013.01); *H04L 43/00* (2013.01)
USPC .......................................................... 370/241

(58) Field of Classification Search
None
See application file for complete search history.

(56) References Cited

U.S. PATENT DOCUMENTS

| | | | |
|---|---|---|---|
| 6,397,259 B1 * | 5/2002 | Lincke et al. ................. | 709/236 |
| 2007/0011317 A1 * | 1/2007 | Brandyburg et al. ......... | 709/224 |
| 2007/0206497 A1 * | 9/2007 | Plamondon et al. .......... | 370/231 |
| 2009/0073943 A1 * | 3/2009 | Krishnaswamy et al. .... | 370/338 |
| 2009/0204696 A1 * | 8/2009 | Zhang et al. .................. | 709/223 |

* cited by examiner

*Primary Examiner* — Kevin C Harper
*Assistant Examiner* — Samina Choudhry
(74) *Attorney, Agent, or Firm* — Edwards Wildman Palmer LLP; Christopher J. Capelli; Adam P. Daniels

(57) ABSTRACT

Method and apparatus of transaction determination for non-tcp protocols employs a network analyzer to observe network traffic. Non-TCP protocol sequential traffic from a client to a server and sequential traffic following from a server to the client are considered to be one transaction for test and measurement analysis purposes.

19 Claims, 3 Drawing Sheets

METHOD AND APPARATUS OF TRANSACTION DETERMINATION FOR NON-TCP PROTOCOLS

CROSS REFERENCE TO RELATED APPLICATIONS

This application claims priority of U.S. provisional patent application 61/034,922, filed Mar. 7, 2008.

BACKGROUND OF THE INVENTION

This invention relates to network test and measurement, and more particularly to an apparatus and method of determining transactions with non-TCP protocols.

In installation, operation and maintenance of networks, determination of where issues or problem points arise can be complex.

Applications that are request/response based, but do not use TCP as the transport protocol, are susceptible to issues with application, server, and/or network responsiveness in similar ways as applications that use TCP as the transport protocol.

However, heretofore, measurement of client/server response time for non-TCP protocols was not available. The TCP protocol provides reliability of data transfer and therefore request/response determination and specifically the beginning and end of the request/response can be determined based on the transport protocol. There are limitations in this regard with a non-TCP transport protocol.

A network engineer or technician looking to resolve problems would be interested in determining the timing of interaction of clients on the network with a server, to help determine where problems might be occurring.

SUMMARY OF THE INVENTION

In accordance with the invention, a method and apparatus is provided for determining non-TCP protocol transactions. Timing measurements and other data analysis can thereby be made.

Accordingly, it is an object of the present invention to provide an improved method and apparatus for network test and measurement.

It is a further object of the present invention to provide an improved method and apparatus for determining non-TCP protocol transactions on a network.

It is yet another object of the present invention to provide an improved method and apparatus to characterize timing of non-TCP protocol traffic on a network.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a method and apparatus to determine transactions in non-TCP networking protocols, which can then allow measurement of transaction timing.

In accordance with the present apparatus and method, client and server determination for non-tcp protocols is made. Once the client and server determination is made, the invention tracks the first packet and last packet from the client as well as the first and last packet from the server. A single transaction is determined to be all sequential packets from the clients followed by all sequential packets from the server. Once a server packet is seen, the next client packet marks the beginning of a new transaction. The client and server as well as the protocol being employed are used to determine if the flow (communication between a client and server) should be recognized, analyzed, and classified as non-streaming traffic.

Figure 1:
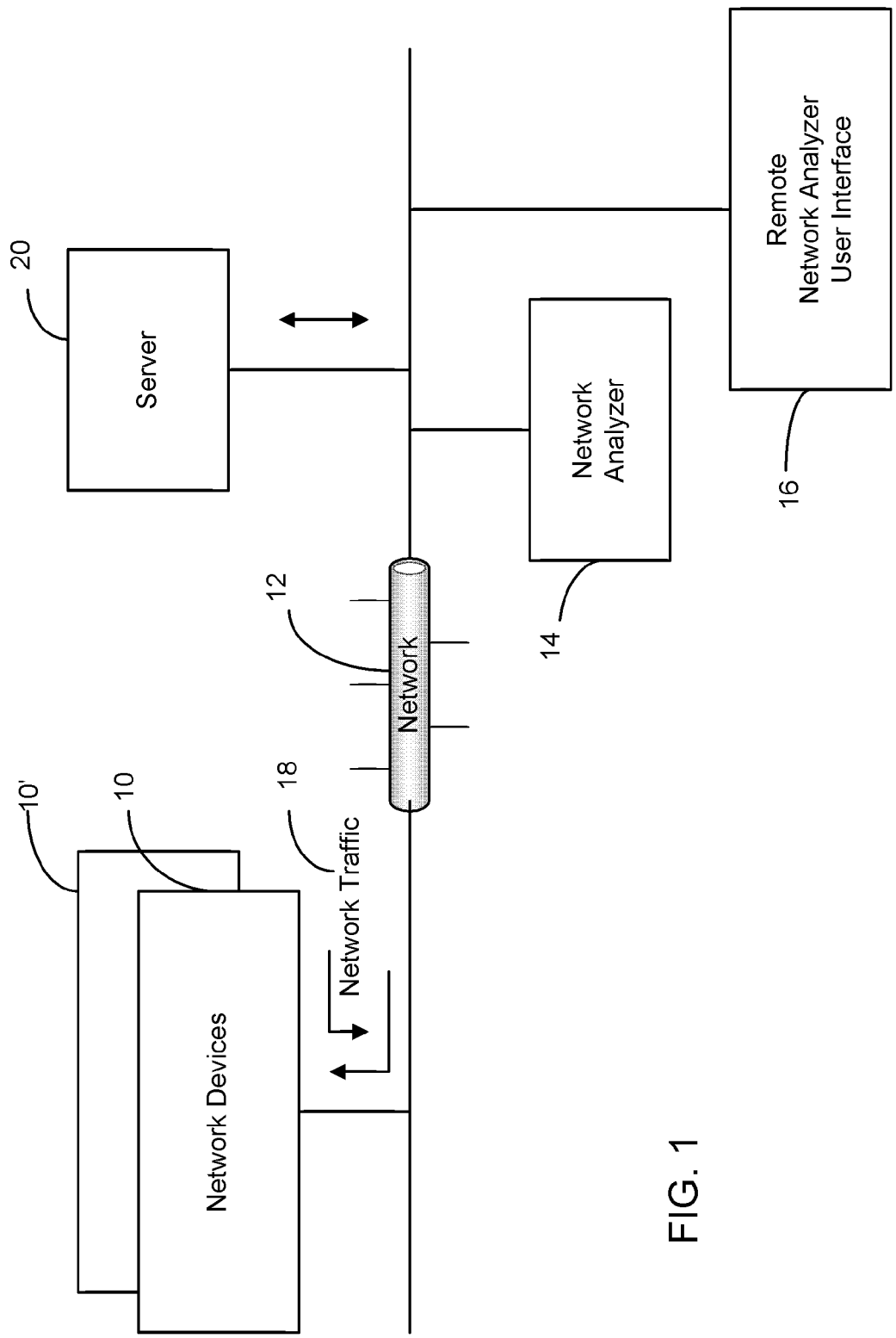
FIG. 1 is a block diagram of a network with a test instrument installed thereon.

Referring to FIG. 1, a block diagram of a network with an apparatus in accordance with the disclosure herein, a network may comprise plural network devices 10, 10', etc., which communicate over a network 12 by sending and receiving network traffic 18. The traffic may be sent in packet form, with varying protocols and formatting thereof.

A network analyzer 14 is also connected to the network, and may include a remote network analyzer interface 16 that enables a user to interact with the network analyzer to operate the analyzer and obtain data therefrom remotely from the physical location of the analyzer. In the illustration of FIG. 1, the analyzer is attached to the network near a server 20, which may be interacting with the various network devices 10, 10', etc., which can be considered clients in the current explanation.

The network analyzer comprises hardware and software, CPU, memory, interfaces and the like to operate to connect to and monitor traffic on the network, as well as performing various testing and measurement operations, transmitting and receiving data and the like. The remote network analyzer typically is operated by running on a computer or workstation interfaced with the network.

Figure 2:
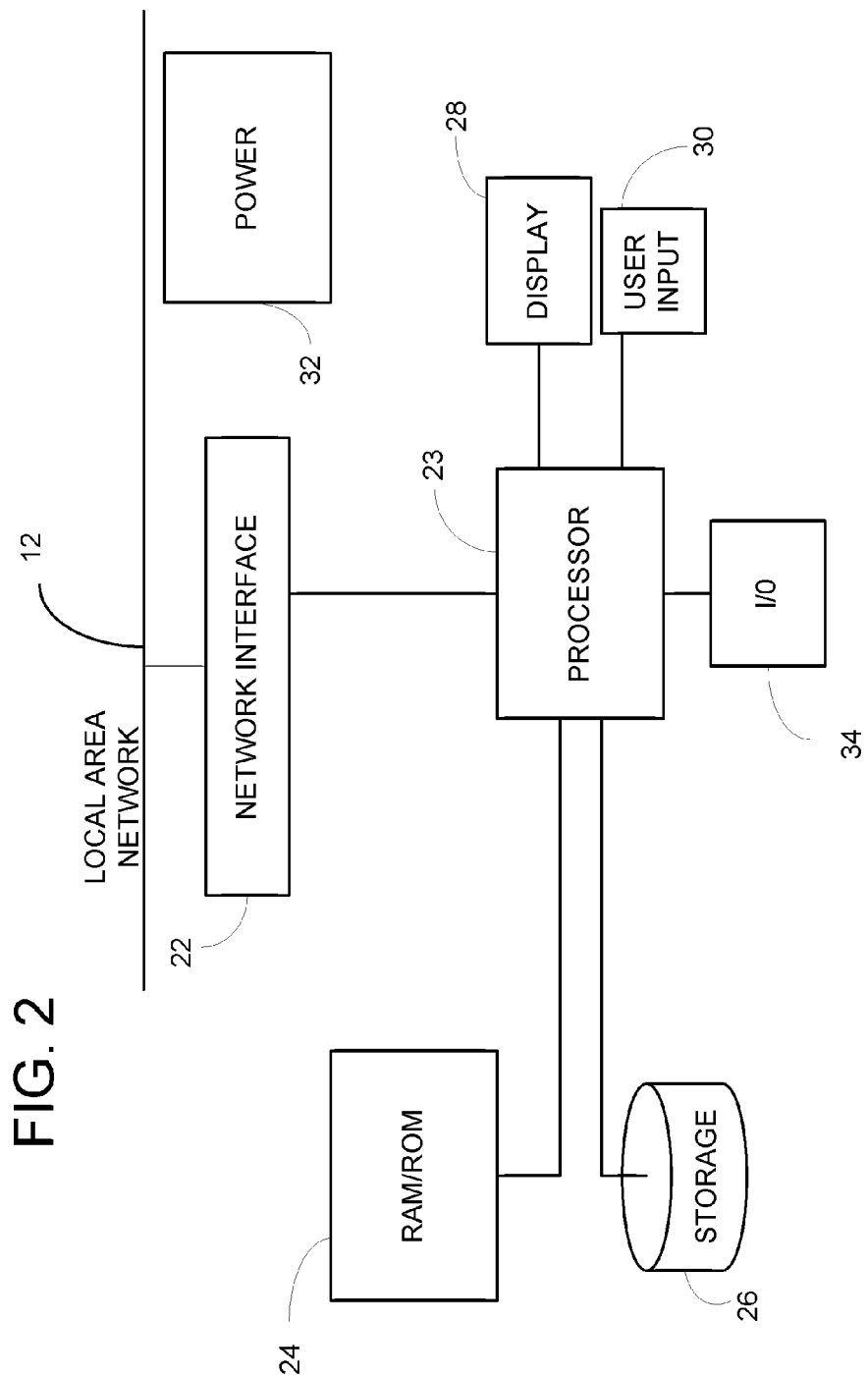
FIG. 2 is a block diagram of a test instrument.

FIG. 2 is a block diagram of a test instrument/analyzer 40, wherein the instrument may include network interface 22 which attaches the device to a network 12, one or more processors 23 for operating the instrument, memory such as RAM/ROM 24 or persistent storage 26, display 28, user input devices 30 (such as, for example, keyboard, mouse or other pointing devices, touch screen, etc.), power supply 32 which may include battery or AC power supplies, other interface 34 which attaches the device to a network or other external devices (storage, other computer, etc.).

In operation, the network test instrument is attached to the network, near a server in the illustration of FIG. 1, although the test instrument can be attached elsewhere, such as near the client or other location, depending on the network behavior that is being observed or measured by a technician.

Figure 3:
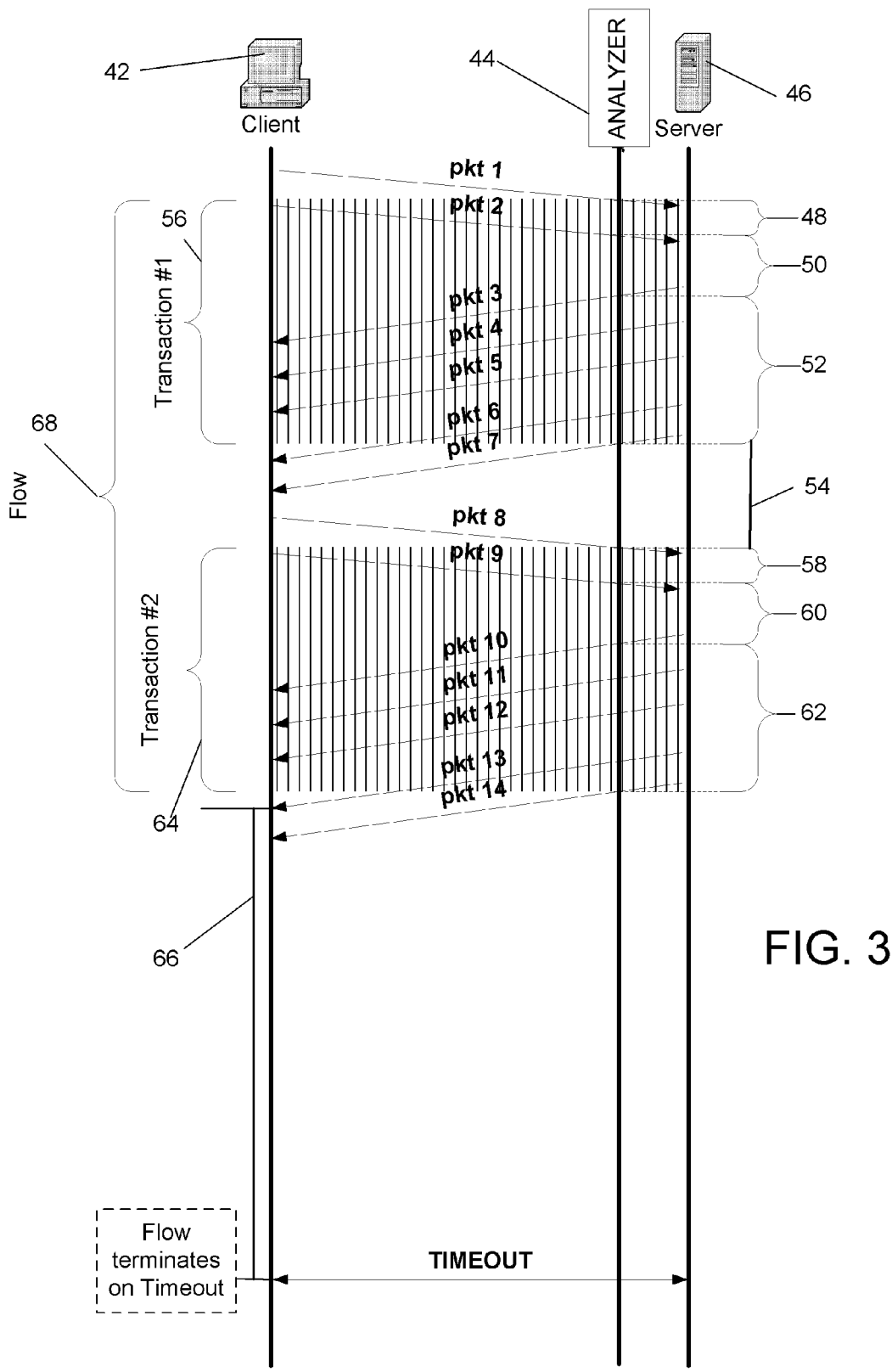
FIG. 3 is a representation of timing between a client and a server on a network.

Referring now to FIG. 3, a representation of and example of timing between a client and a server on a network and the analysis thereof in accordance with the method and apparatus, a client 42, which may be a computer or device on the network, analyzer 44, and server 46 are all represented on the network. In the particular configuration shown, the analyzer 44 is placed near the server 46 to provide measurements closest to the server location. The client beings transmitting data during time 48, pkt1, pkt2, followed by a pause in transmission, indicated by time passage 50. The time passage 50 is sufficiently long that it is recognized as a break in the transmission of data from client 42, whereupon the server 46 transmits data on the network back to the client during time 52, pkt3, pkt4, pkt5, pkt6, pkt7. The server then stops transmitting in time block 54, and the exchange of data between the client and server is thereby recognized as a first transaction 56, denoted Transaction #1 in FIG. 3.

Next, client 4 begins another transmission, pkt8 and pkt9 during time period 58, followed by a quiet time period 60 which is interpreted as the end of the client's present transmission. The server then sends response pkt10, pkt11, pkt12, pkt13, pkt14 during time period 62, and upon cessation of that set of transmissions by the server, the analyzer 44 determines that the current client/server transaction 64 has been completed, denoted Transaction #2 in FIG. 3.

After a timeout period 66, it is determined that the communication (flow) 68 between client and server has terminated.

The various timing measurements are observed by analyzer 44 and may be recorded for use in network test and measurement operations.

Accordingly, the method and apparatus provides client and server determination for non-tcp protocols.

In operation, the test instrument is connected to the network and observes network traffic, identifying clients and servers that are operating and sending traffic on the network. For an individual flow (communication between a client and server), the apparatus and method tracks the first packet and last packet from the client as well as the first and last packet from the server. A single transaction is determined to be all sequential packets from the client followed by all sequential packets from the server. Once a server packet is seen, the next client packet marks the beginning of a new transaction.

The analyzer 44 is configured such that a number of default protocols are recognized, analyzed, and classified as streaming or non-streaming. Further, a user can specify a custom protocol or default protocol on a non-standard port that is to be recognized, analyzed, and classified as streaming or non-streaming, since users may operate protocols on non-standard ports.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method of determining transactions for non transmission control protocol (TCP) traffic on a network, wherein the method is performed in one or more processors, comprising:
   determining transmission of all sequential packets for non-TCP traffic in the network from a client;
   determining transmission of all sequential packets for non-TCP traffic from a server after the transmission of the all sequential packets from the client;
   determining a completed transaction after each transmission of the all sequential packets for non-TCP traffic from the client and the server is determined; and
   marking a beginning of a new transaction for a subsequently transmitted packet from the client, in response to determining transmission of at least one of the all sequential packets for non-TCP traffic from the server.

2. The method according to claim 1, further comprising monitoring said non-TCP traffic from a location closer to the server than to the client.

3. The method according to claim 1, further comprising monitoring said non-TCP traffic from a location closer to the client than to the server.

4. The method according to claim 1, further comprising considering that communication has terminated between a client and server after a timeout period of time has passed without server packets or client packets being determined.

5. An apparatus for determining transactions for non-TCP traffic on a network, comprising:
   a network interface for connecting to and observing traffic on a network;
   a processor;
   a storage medium for storing data;
   wherein said processor operates said apparatus to:
   determine, for non-TCP traffic, transmission of all sequential packets from a client;
   determine, for non-TCP traffic, transmission of the all sequential packets from a server after the transmission of the all sequential packets from the client;
   determine a completed transaction after each transmission of the all sequential packets from the client and the server is determined; and
   mark a beginning of a new transaction for a subsequently transmitted packet from the client in response to a determined transmission of at least one of the all sequential packets from the server.

6. The apparatus according to claim 5, wherein said apparatus monitors said non-TCP traffic from a location closer to the server than to the client.

7. The apparatus according to claim 5, wherein said apparatus monitors said non-TCP traffic from a location closer to the client than to the server.

8. The apparatus according to claim 5, wherein said processor further operates said apparatus to consider that communication has terminated between a client and server after a timeout period of time has passed without server packets or client packets being determined.

9. The apparatus according to claim 5, further comprising a remote user interface enabling a user to remotely interact with the apparatus from location physically remote from a physical location of the apparatus.

10. The method according to claim 1 further comprising providing a remote user interface enabling a user to remotely observe information about determined transactions from a location physically remote from a physical location of the determined transmissions.

11. The method according to claim 1, further comprising recognizing plural default protocols in said traffic.

12. The method according to claim 11, further comprising classifying recognized protocols as streaming or non-streaming.

13. The method according to claim 1, further comprising enabling a user to specify a custom protocol or default protocol on a non-standard port that is to be recognized, analyzed, and classified as streaming or non-streaming.

14. The method according to claim 11, further comprising enabling a user to specify a default protocol on a non-standard port to be recognized.

15. A network test instrument for characterizing timing of non-TCP traffic on a communication network, comprising:
   a network interface for connecting to and observing traffic on the network;
   a processor;
   a storage medium for storing data;
   wherein said processor is operable to cause said network test instrument to:

determine, for non-transmission control protocol (TCP) traffic, transmission of all sequential packets from a client;

determine, for non-TCP traffic, transmission of all sequential packets from a server after the transmission of the all sequential packets from the client;

determine a complete transaction after each transmission of the all sequential packets from the client and the server is determined;

mark a beginning of a new transaction for a subsequently transmitted packet from the client in response to a determined transmission of at least one of the all sequential packets from the server; and wherein said processer operates said network test instrument to further consider that communication has terminated between the client and the server after a timeout period of time has passed without transmission of any packets from the server and client being determined, and wherein the network test instrument further comprises a remote user interface that enables a user to remotely interact with the network test instrument from a location physically remote from a physical location of the network test instrument.

16. The network test instrument according to claim 15, wherein said processor further operates said network test instrument to recognize plural default protocols.

17. The network test instrument according to claim 16, wherein processor further operates said network test instrument to classify recognized protocols as streaming or non-streaming.

18. The network test instrument according to claim 15, wherein said processor further operates said network test instrument to enable a user to specify a custom protocol or default protocol on a non-standard port that is to be recognized, analyzed, and classified as streaming or non-streaming.

19. The network test instrument according to claim 15, wherein said processor further operates said network test instrument to enable a user to specify a default protocol on a non-standard port to be recognized.

* * * * *